US012175475B2

(12) United States Patent
Bence et al.

(10) Patent No.: US 12,175,475 B2
(45) Date of Patent: Dec. 24, 2024

(54) REMOTE AIRLINE AGENT ON-DEMAND

(71) Applicant: UNITED AIRLINES, INC., Chicago, IL (US)

(72) Inventors: Robert Bence, Prosper, TX (US); Stephanie Ricker, Westminster, CO (US); Shubhankar Chowdhury, Buffalo Grove, IL (US); James Stathopoulos, Elmhurst, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 0 days.

(21) Appl. No.: 18/437,506

(22) Filed: Feb. 9, 2024

(65) Prior Publication Data
US 2024/0177174 A1 May 30, 2024

Related U.S. Application Data

(63) Continuation of application No. 17/673,358, filed on Feb. 16, 2022, now Pat. No. 11,935,070.

(51) Int. Cl.
G06Q 10/00 (2023.01)
G06Q 10/02 (2012.01)
G06Q 10/0631 (2023.01)
G06Q 30/016 (2023.01)

(52) U.S. Cl.
CPC ........... *G06Q 30/016* (2013.01); *G06Q 10/02* (2013.01); *G06Q 10/063112* (2013.01)

(58) Field of Classification Search
USPC .......................................................... 705/5
See application file for complete search history.

(56) References Cited

U.S. PATENT DOCUMENTS

| 7,372,952 | B1* | 5/2008 | Wu ..................... H04M 3/5233 379/265.11 |
| 8,681,966 | B1 | 3/2014 | Le Gouez et al. |
| 9,426,115 | B1* | 8/2016 | Pauls .................... H04L 51/48 |
| 9,848,082 | B1* | 12/2017 | Lillard ............. H04M 3/53341 |
| 10,204,317 | B2 | 2/2019 | Cunningham et al. |
| 11,227,239 | B2 | 1/2022 | Beynel et al. |

(Continued)

OTHER PUBLICATIONS

International Application No. PCT/US2023/012709, International Search Report and Written Opinion, mailed May 4, 2023.
Office Action for U.S. Appl. No. 17/673,358, dated Aug. 2, 2023.

*Primary Examiner* — Tonya Joseph
(74) *Attorney, Agent, or Firm* — MARSHALL, GERSTEIN & BORUN LLP

(57) ABSTRACT

A method and system may automatically provide a remote airline agent to a user. A server device receives pending requests to communicate with a remote airline agent from users each attempting to modify a flight segment or obtain assistance related to the flight segment. For each of the requests, the server device obtains flight information for the flight segments to identify a flight urgency level or a flight criticality level for the flight segment. The server device assigns a priority level to each of the pending requests based on one or more attributes associated with each pending request, ranks the pending requests in accordance with the assigned priority levels, and automatically connects to a client device for a highest ranked request of the pending requests to initiate a video chat between the user and the remote airline agent.

20 Claims, 6 Drawing Sheets

(56) References Cited

U.S. PATENT DOCUMENTS

| | | | |
|---|---|---|---|
| 2002/0194047 A1* | 12/2002 | Edinger | G06Q 30/0201 |
| | | | 705/7.29 |
| 2006/0153356 A1 | 7/2006 | Sisselman et al. | |
| 2010/0124325 A1* | 5/2010 | Weng | G10L 15/22 |
| | | | 704/251 |
| 2012/0122482 A1* | 5/2012 | Rajaniemi | H04W 4/50 |
| | | | 455/456.1 |
| 2013/0039483 A1* | 2/2013 | Wolfeld | H04M 3/00 |
| | | | 379/265.03 |
| 2013/0051545 A1* | 2/2013 | Ross | H04M 3/523 |
| | | | 379/265.02 |
| 2014/0113548 A1* | 4/2014 | Camulli | H04M 3/5231 |
| | | | 455/41.1 |
| 2021/0133804 A1* | 5/2021 | Adibi | G06Q 10/06312 |

* cited by examiner

200

| ATTRIBUTE 210 | WEIGHT 220 |
|---|---|
| Flight Connection Time | 60 (within hr)<br>10 (1-2 hrs) |
| Flight Connection Type | 20 (International)<br>5 (Domestic) |
| Irregular Operations (IRROPS) | 80 |
| Group Size | 50 (>16 passengers)<br>30 (10-16 passengers) |
| Flight Status | 60 (canceled)<br>20 (delayed) |
| Special Service Request | 40 |
| Mandatory Covid Test | 30 |

Pending Call

| Customer Name | Device Type | Online Since Time | Department | Priority | Key Attributes | Tag |
|---|---|---|---|---|---|---|
| Ellen R. | Browser | 1 Min | Code | H | IRROPS, CANCEL, >60 | |

Queued Call(s)

| Customer Name | Device Type | Online Since Time | Department | Priority | Key Attributes | Tag |
|---|---|---|---|---|---|---|
| Christy B. | SDK | 1 Min | Code | H | IRROPS, WCHR, Group | |
| Pat R. | Browser | 3 Min | Code | H | IRROPS, WCHR, Group | |
| Ed B. | SDK | 1 Min | Code | H | WCHR, Silver | |
| Jose S. | Browser | 5 Min | Code | M | Group | |
| Adi O. | Browser | 3 Min | Code | M | Deaf, Silver | |
| Slav B. | Browser | 7 Min | Code | M | GLBS, DOM | |
| Maria C. | SDK | 5 Min. | Code | L | DOM | |

REMOTE AIRLINE AGENT ON-DEMAND

CROSS-REFERENCE TO RELATED APPLICATIONS

This application is a continuation of U.S. patent application Ser. No. 17/673,358 entitled "Remote Airline Agent On-Demand," filed on Feb. 16, 2022, the entire contents of which is hereby expressly incorporated herein by reference.

TECHNICAL FIELD

The present disclosure generally relates to an on-demand remote airline agent and, more particularly to prioritizing user requests to communicate with a remote airline agent and connecting users to remote airline agents to modify or obtain assistance related to flight segments.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many airline passengers communicate with airline agents at the airport to modify or obtain assistance related to a flight segment. For example, when the flight segment is canceled or delayed, airline passengers may communicate with an airline agent at the airport to reschedule their flight. However, in some scenarios such as when a flight is canceled due to weather, several passengers may need assistance at the same time while airline agents at other airports are free to provide assistance. Thus, airline agents at one airport may be overloaded with requests from passengers while airline agents at another airport are being underutilized resulting in an inefficient process for handling passenger requests for assistance.

BRIEF SUMMARY

To provide assistance to airline passengers, an on-demand remote airline agent system allows a user to request assistance via their client device, such as a smart phone, tablet, etc. The request for assistance is then provided to a server device that routes the request to client device(s) of remote agent(s) and prioritizes the request based on attributes associated with the request including attributes associated with the flight segment and/or attributes associated with the user. The server device may rank the requests assigned to a particular remote agent based on their respective priority levels, and provide the requests for the particular remote agent in a ranked order on a user interface of the remote agent's client device. Then the server device may automatically connect the client device associated with the highest ranked request to the remote agent's client device to initiate a video chat between the user of the highest ranked request and the remote agent. In other implementations, the remote agent may view each of the requests in the ranked order and select a user control on the user interface to initiate the video chat with the user.

In this manner, the present embodiments advantageously allow a passenger to communicate with a remote airline agent anywhere in the country or the world to assist the passenger. This improves the efficiency of the process by identifying a remote airline agent having the specialized skills to handle the passenger's request. Moreover, by prioritizing requests and handling them in order of priority, the present embodiments ensure that the most urgent requests are handled right away instead of in the order in which they are initiated. This improves airline operations and may reduce the likelihood of further flight delays by being able to efficiently schedule passengers on the next scheduled flight to their destinations.

This also improves the efficiency of the process by spreading the requests out across remote airline agents in different locations so that one location is not overloaded with requests during a snow storm or other weather event, for example while another location has airline agents who are not assisting anyone. Still further, by initiating a video chat between a user and a remote airline agent, the user may feel as if they were physically in front of the remote airline agent improving the user experience for the passenger. This may make it easier to communicate with the remote airline agent, particularly if the passenger is deaf or has another disability which would make audio communication difficult. Accordingly, the present embodiments include the advantages of allowing a passenger to communicate with a remote airline agent in a different part of the country or world without the drawbacks of audio or text communication.

In an embodiment, a method for automatically providing a remote airline agent to a user is provided. The method includes receiving a plurality of pending requests to communicate with a remote airline agent from a plurality of users each attempting to modify a flight segment or obtain assistance related to the flight segment. Each request includes identification information for a user initiating the request, and flight information for the flight segment. For each of the plurality of requests, the method includes obtaining from an airline reservation database, flight information for the flight segments to identify a flight urgency level or a flight criticality level for the flight segment, and assigning a priority level to each of the plurality of pending requests based on one or more attributes associated with each pending request. The one or more attributes include at least one of: flight attributes related to a flight status, flight operations, a flight connection time, the flight urgency level, or the flight criticality level for the flight segment, or user attributes related to a user status, a user wait time, or a group size. The method further includes ranking the plurality of pending requests in accordance with the assigned priority levels, and automatically connecting to a client device for a highest ranked request of the plurality of pending requests to initiate a video chat between the user and the remote airline agent to modify the flight segment or provide assistance related to the flight segment.

In another embodiment, a system for automatically providing a remote airline agent to a user is provided. The system includes a communication network, one or more processors coupled to the communication network, and a non-transitory computer readable memory coupled to the communication network and the one or more processors. The memory includes computer-executable instructions stored thereon. When executed by the one or more processors, the instructions cause the one or more processors to receive, via the communication network, a plurality of pending requests to communicate with a remote airline agent from a plurality of users each attempting to modify a flight segment or obtain assistance related to the flight segment. Each request includes identification information for a user initiating the request, and flight information for the flight segment. For each of the plurality of requests, the instructions cause the one or more processors to obtain, from an airline reservation database, flight information for the flight segment to identify a flight urgency level or a flight criticality level for the flight segment, and assign a priority level to each of the plurality of pending requests based on one or more attributes associated with each pending request. The one or more attributes include at least one of: flight attributes related to a flight status, flight operations, a flight connection time, the flight urgency level, or the flight criticality level for the flight segment, or user attributes related to a user status, a user wait time, or a group size. The instructions further cause the one or more processors to rank the plurality of pending requests in accordance with the assigned priority levels, and automatically connect to a client device for a highest ranked request of the plurality of pending requests to initiate a video chat between the user and the remote airline agent to modify the flight segment or provide assistance related to the flight segment.

In yet another embodiment, a non-transitory computer readable memory includes computer-executable instructions stored thereon. When executed by the one or more processors, the instructions cause the one or more processors to receive, via the communication network, a plurality of pending requests to communicate with a remote airline agent from a plurality of users each attempting to modify a flight segment or obtain assistance related to the flight segment. Each request includes identification information for a user initiating the request, and flight information for the flight segment. For each of the plurality of requests, the instructions cause the one or more processors to obtain, from an airline reservation database, flight information for the flight segment to identify a flight urgency level or a flight criticality level for the flight segment, and assign a priority level to each of the plurality of pending requests based on one or more attributes associated with each pending request. The one or more attributes include at least one of: flight attributes related to a flight status, flight operations, a flight connection time, the flight urgency level, or the flight criticality level for the flight segment, or user attributes related to a user status, a user wait time, or a group size. The instructions further cause the one or more processors to rank the plurality of pending requests in accordance with the assigned priority levels, and automatically connect to a client device for a highest ranked request of the plurality of pending requests to initiate a video chat between the user and the remote airline agent to modify the flight segment or provide assistance related to the flight segment.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 illustrates an exemplary table of attributes and corresponding weights for prioritizing requests to communicate with a remote airline agent;

FIG. 3 illustrates an exemplary user interface that presents pending requests to communicate with the remote airline agent in a ranked order based on attributes associated with each pending request, which may be presented on a client device of a remote airline agent;

DETAILED DESCRIPTION

Figure 1:
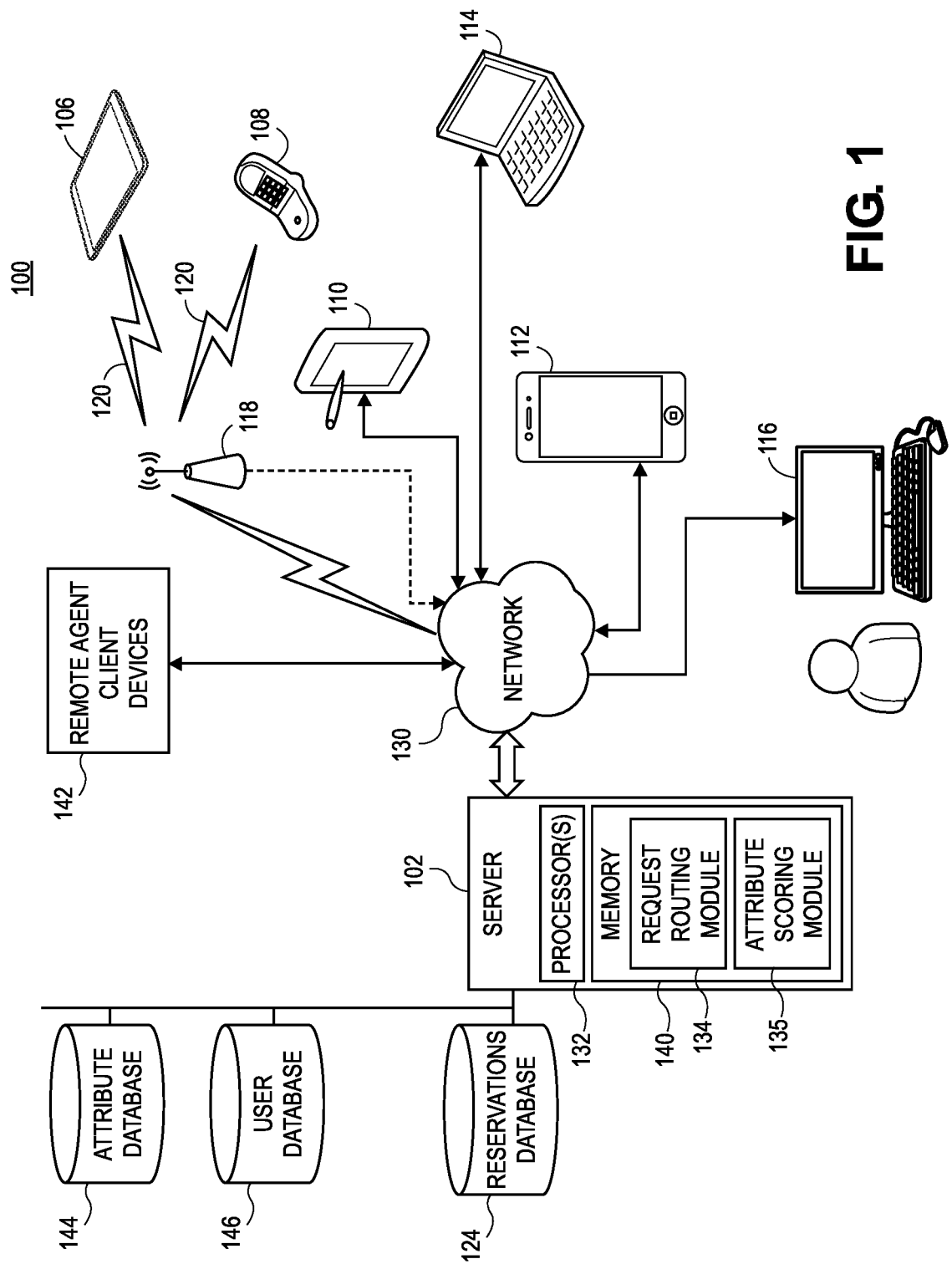
FIG. 1 illustrates a block diagram of a computer network and system on which an on-demand remote airline agent system may operate in accordance with an example aspect of the present disclosure.

Although the following text sets forth a detailed description of numerous different embodiments, it should be understood that the legal scope of the description is defined by the words of the claims set forth at the end of this patent and equivalents. The detailed description is to be construed as providing examples only and does not describe every possible embodiment since describing every possible embodiment would be impractical. Numerous alternative embodiments could be implemented, using either current technology or technology developed after the filing date of this patent, which would still fall within the scope of the claims.

Generally speaking, techniques for automatically providing a remote airline agent to a user may be implemented in one or more network servers, one or more passenger client devices, one or more remote agent client devices, or a system that includes a combination of these devices. However, for example purposes, the examples below focus primarily on an embodiment in which a passenger client device transmits a request to a server device to communicate with a remote airline agent. The request may be for modifying a flight segment or obtaining assistance related to the flight segment. Additionally, the request may include identification information for the user initiating the request, flight information for the flight segment, a description of the type of request or the type of assistance needed, etc.

The server device may then identify one or more remote airline agents in which to route the request based on the information included in the request. For example, if the request is from a passenger who speaks Spanish, the server device may route the request to remote airline agents who speak Spanish. Accordingly, the server device may include the request in the queue of requests for the Spanish speaking remote airline agents. The first Spanish speaking remote airline agent who has the request at the top of their queue may initiate a video chat with the passenger.

Furthermore, the server device may assign a priority level to the request based on attributes associated with the request. For example, the priority level may be a category from a set of categories (e.g., Low, Medium, High) or may be a priority score. In some implementations, the server device may calculate a priority score for the request by assigning weights to different attributes associated with the request and aggregating or combining the weights in any suitable manner to generate the priority score. For example, a first weight may be assigned based on the flight connection time for the request, a second weight may be assigned based on the group size for the request, a third weight may be assigned based on the amount of time in which the passenger has been waiting to communicate with a remote airline agent, etc. The server device may then rank the request in a queue of ranked requests based on the priority level for the request. In some implementations, the request may be ranked in a master queue of all of the pending requests for all of the remote airline agents. Then requests that are not assigned to a particular remote airline agent may be filtered out of the particular remote airline agent's queue. In other implementations, a remote airline agent's client device may receive the request with a priority level (e.g., a priority score). Then the remote airline agent's client device may rank the request within the particular queue of requests assigned to the remote airline agent.

In any event, the server device may provide the request for display in a ranked order to the remote airline agent client devices assigned to handle the request. In response to determining that the request is the highest ranked request in a remote airline agent's queue, the remote airline agent client device may automatically connect to the passenger client device associated with the request to initiate a video chat between the remote airline agent and the passenger.

FIG. 1 illustrates various aspects of an example environment implementing an on-demand remote airline agent system 100. The environment 100 may include a server device 102, remote agent client devices 142, and/or a plurality of passenger client devices 106-116 which may be communicatively connected through a network 130, as described below. According to embodiments, the server device 102 may be a combination of hardware and software components, also as described in more detail below.

The server device 102 may have an associated airline reservations database 124 for storing flight information related to flight segments, such as passenger reservations for departing flights including reserved seat assignments, passenger priority information, etc. (e.g., an airline computer reservation system such as SHARES, Amadeus, Travelport, SABRE, etc.). The server device 102 may also have an associated attribute database 144 that stores attributes for assigning priority levels to requests and their corresponding weights. Still further, the server device 102 may have an associated user database 146 that stores user information in a user profile such as a user status, a group size associated with the user for a particular flight segment, the user's age, whether the user has an infant, special service requests associated with the user, the user's preferred language, any disabilities that the user has, a user wait time indicative of the amount of time that the user has been waiting to speak to a remote airline agent, etc. Moreover, the server device 102 may include a memory 140, one or more processors 132 such as a microcontroller or a microprocessor, a random-access memory, and/or an input/output (I/O) circuit, all of which may be interconnected via an address/data bus.

The memory 140 and/or the RAM may store various applications for execution by the one or more processors 132. For example, a user interface application may provide a user interface to the server device 102, which user interface may, for example, allow the system administrator to configure, troubleshoot, and/or test various aspects of the server's operation. A server application may operate to route requests to communicate with remote airline agents to remote agent client devices 142. The server application may be a single module or a plurality of modules.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a request routing module 134 and an attribute scoring module 135.

To route requests to communicate with remote airline agents, a request routing module 134 identifies one or more remote airline agents equipped to handle a particular request and adds the particular request to their respective queue(s). For example, a first set of remote airline agents may be equipped to handle general requests, a second set of remote airline agents may be equipped to handle requests made by Spanish speakers, a third set of remote airline agents may be equipped to handle requests made by passengers who are deaf, a fourth set of remote airline agents may be equipped to handle requests related to COVID-19 testing, etc. Some of the remote airline agents may have multiple special skills, such that they can receive requests corresponding to different routing categories. For example, a remote airline agent who is equipped to handle requests related to COVID-19 testing and is equipped to handle requests made by passengers who are deaf may receive both types of requests from the request routing module 134.

In some implementations, the request routing module 134 routes the requests by sending each of the requests to each of the remote airline agents. When the request routing module 134 transmits a request, the requesting routing module 134 includes a routing category with the request. Then the remote agent client devices 142 filter the request from their respective queues depending on whether the corresponding agent is equipped to receive requests for the particular routing category. When a request is handled by one of the remote airline agents, the request is removed from the queues of each the remote airline agents which received the request. This procedure is described in more detail with reference to FIG. 5.

The attribute scoring module 135 obtains a request and identifies attributes associated with the request, such as the flight connection time until the upcoming flight segment, whether the upcoming flight segment is international or domestic, whether there are irregular operations (IRROPs) for the upcoming flight segment, the group size of the passenger's group, the flight status of the upcoming flight (e.g., canceled, delayed, on time, etc.), special service requests for the passenger, whether there is a mandatory COVID-19 test required for the upcoming flight, the fare class for the passenger, the passenger's airline status, whether the passenger has an infant, etc.

Then for each identified attribute, the attribute scoring module 135 assigns a score or weight to the request. For some attributes, the attribute scoring module 135 assigns one score or weight to the request if the request is associated with a particular attribute. For other attributes, the attribute scoring module 135 assigns different scores or weights to the request depending on sub-attributes associated with the attribute. For example, for the group size attribute, the attribute scoring module 135 may assign a first score if the group size is between 10 and 16 passengers and a second score if the group size is above 16 passengers. If the group size is below 10 passengers, the attribute scoring module 135 does not identify the group size attribute for the request and does not assign a score.

The attribute scoring module 135 may then aggregate or combine the scores or weights in any suitable manner to generate an overall score for the request. Then the attribute scoring module 135 may determine a priority level for the request based on the overall score. For example, the priority level may be the overall score. In another example, the priority level may be a category, such as Low, Medium, or High, where the attribute scoring module 135 assigns a Low priority to the request if the overall score is below a first threshold score, assigns a Medium priority to the request if the overall score is at or above the first threshold score but below a second threshold score, and assigns a High priority to the request if the overall score is at or above the second overall score. In yet another example, the priority level may include both a category and a numeric value. This procedure is described in more detail with reference to FIG. 2.

The passenger client devices 106-116 may include, by way of example, a tablet computer 106, a cell phone 108, a personal digital assistant (PDA) 110, a mobile device smart-phone 112 also referred to herein as a "mobile device," a laptop computer 114, a desktop computer 116, a portable media player, an airline kiosk, a home phone, a wearable computing device, smart glasses, smart watches, phablets, other smart devices, devices configured for wired or wireless RF (Radio Frequency) communication, etc. Of course, any network-enabled device appropriately configured may interact with the on-demand remote airline agent system 100. The passenger client devices 106-116 need not necessarily communicate with the network 130 via a wired connection. In some instances, the passenger client devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

The passenger client devices 106-116 may include a display, a communication unit, a user-input device, a memory, one or more processors such as a microcontroller or a microprocessor, a random-access memory (RAM), and/or an input/output (I/O) circuit, all of which may be interconnected via an address/data bus. The memory may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, and/or other data necessary to interact with the server device 102 through the digital network 130. In some embodiments, the one or more processors may also include, or otherwise be communicatively connected to, other data storage mechanisms (e.g., one or more hard disk drives, optical storage drives, solid state storage devices, etc.) that reside within the passenger client device 106-116.

The communication unit may communicate with the server device 102 via any suitable wireless communication protocol network, such as a wireless telephony network (e.g., GSM, CDMA, LTE, etc.), a Wi-Fi network (802.11 standards), a WiMAX network, a Bluetooth network, etc.

The user-input device may include a "soft" keyboard that is displayed on the display of the passenger client device 106-116, an external hardware keyboard communicating via a wired or a wireless connection (e.g., a Bluetooth keyboard), an external mouse, or any other suitable user-input device.

The one or more processors may be adapted and configured to execute any one or more of the plurality of software applications and/or any one or more of the plurality of software routines residing in the memory, in addition to other software applications. One of the plurality of applications may be a client application that may be implemented as a series of machine-readable instructions for performing the various tasks associated with receiving information at, displaying information on, and/or transmitting information from the passenger client device 106-116.

One of the plurality of applications may be a native application and/or web browser, such as Apple's Safari®, Google Chrome™, Microsoft Internet Explorer®, and Mozilla Firefox® that may be implemented as a series of machine-readable instructions for receiving, interpreting, and/or displaying web page information from the server device 102 while also receiving inputs from the user. Another application of the plurality of applications may include an embedded web browser that may be implemented as a series of machine-readable instructions for receiving, interpreting, and/or displaying web page information from the server device 102. One of the plurality of routines may include a remote airline agent request routine which provides a request to the server device 102 to communicate with a remote airline agent to modify a flight segment or obtain assistance related to the flight segment. Another routine in the plurality of routines may include an order confirmation routine that presents an order confirmation message on the user interface including an airline reservation indicator corresponding to a modification to a flight segment (e.g., a PNR).

Similar to the passenger client devices 106-116, the remote agent client devices 142 may include, by way of example, a tablet computer, a cell phone, a PDA, a mobile device smart-phone, a laptop computer, a desktop computer, a portable media player, an airline kiosk, a home phone, a wearable computing device, smart glasses, smart watches, phablets, other smart devices, devices configured for wired or wireless RF communication, etc. Of course, any network-enabled device appropriately configured may interact with the on-demand remote airline agent system 100. The remote agent client devices 142 need not necessarily communicate with the network 130 via a wired connection. In some instances, the remote agent client devices 142 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

The remote agent client devices 142 may include a display, a communication unit, a user-input device, a memory, one or more processors such as a microcontroller or a microprocessor, a RAM and/or an I/O circuit, all of which may be interconnected via an address/data bus. The memory may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, and/or other data necessary to interact with the server device 102 through the digital network 130. In some embodiments, the one or more processors may also include, or otherwise be communicatively connected to, other data storage mechanisms (e.g., one or more hard disk drives, optical storage drives, solid state storage devices, etc.) that reside within the passenger client device 106-116.

The communication unit may communicate with the server device 102 via any suitable wireless communication protocol network, such as a wireless telephony network (e.g., GSM, CDMA, LTE, etc.), a Wi-Fi network (802.11 standards), a WiMAX network, a Bluetooth network, etc.

Preferably, a user may launch an airline application from a client device, such as one of the passenger client devices 106-116 to request to communicate with a remote airline agent to implement the on-demand remote airline agent system 100. Additionally, the user may also launch or instantiate any other suitable user interface application (e.g., the native application or web browser, or any other one of the plurality of software applications) to access the server device 102 to request to communicate with the remote airline agent to realize the on-demand remote airline agent system 100. Generally, while the term "user" in many instances may be used interchangeably with the term "customer," and/or the term "passenger" in this specification, the term "user" is used when referring to a person who is operating a client device and is not exclusive of the term "customer" or "passenger." For example, passengers operating client devices may be referred to as users.

Each of the passenger client devices 106-116 and/or the remote agent client devices 142 may interact with the server device 102 to receive web pages and/or server data and may display the web pages and/or server data via a client application and/or an Internet browser. For example, the mobile device 112 may display a web page to a user, may receive an input from the user, and/or may interact with the server device 102 depending on the type of user-specified input. Based upon the client interactions with the server device 102, the server device 102 may enter a request by the passenger into a remote airline agent's queue of requests, cause the remote agent client device 142 to connect to the passenger client device 106-116, etc.

It will be appreciated that although only one server device 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, a payment service server, a payment broker server, a payment handler server, etc. The multiple servers 102 may also include an airline reservations server, such as SHARES, Amadeus, Travelport, SABRE, etc., which may store data for departing flights such as passenger reservations including reserved seat assignments, passenger priority information, etc.

The server device 102 may communicate with the passenger client devices 106-116 and/or the remote agent client devices 142 via the network 130. The digital network 130 may be a proprietary network, a secure public Internet, a virtual private network and/or some other type of network, such as dedicated access lines, plain ordinary telephone lines, satellite links, a wireless telephony network, combinations of these, etc. Where the digital network 130 comprises the Internet, data communication may take place over the digital network 130 via an Internet communication protocol.

A passenger may provide a request to communicate with a remote airline agent via the airline application at the passenger client device 106-116. For example, when a passenger wants assistance related to an upcoming flight segment for a reservation stored at the airline application, the passenger may provide the request by selecting a user control associated with the reservation at the airline application. In some scenarios, when several passengers are likely to need assistance, such as when a flight is canceled or when several flights at an airport are experiencing delays due to weather conditions for example, the server device 102 may provide instructions to the passenger client device 106-116 for communicating with the remote airline agent. For example, the server device 102 may transmit a notification or message to the passenger client device 106-116 suggesting that the passenger may want to communicate with a remote airline agent and including a user control for providing the request. Then in response to receiving a selection of the user control, the notification or message may cause the passenger client device 106-116 to activate the airline application for the user to enable connection to an on demand service that appends the user's request to the queue of pending requests for a remote airline agent and initiates a video chat with the remote airline agent when the user's request is the highest ranked request. In other scenarios, the passenger may provide the request by for example, scanning a QR code at an airport kiosk or other location within the airport that includes an indication that the QR code is a link to providing a request for a particular type of assistance (e.g., assistance with a canceled flight, assistance with COVID-19 testing, etc.).

The request may include identification information for the user and/or the flight segment. For example, the request may include the PNR for the user and the flight segment, the name of the user, a username for accessing a user profile for the user, etc. Then the server device 102 may obtain flight information for the flight segment, for example for the airline reservations database 124 and user information for the user from the user database 146. The flight information may include the destination location for the flight segment, the departure time, the arrival time, whether the flight is domestic or international, flight operations for the flight segment (e.g., irregular operations), a flight criticality level indicative of whether the user has a connecting flight at the destination location that the user needs to make, a flight urgency level indicative of the amount of time until the departure for the flight segment, a flight status indicative of whether the flight has been delayed, canceled, or is on time, whether the flight requires a COVID-19 test, etc. The user information may include the name of the user, the age of the user, a group size associated with the user for the flight segment, whether the user has an infant, a fare class for the user, a user status, a special service requests associated with the user, such as whether the user is an unaccompanied minor, requires a wheelchair, requires a service animal, requires an oxygen tank, is blind, is deaf, etc.

The attribute scoring module 135 may then determine a priority level for the request based on the flight information and/or the user information. FIG. 2 illustrates an example table 200 of attributes 210 and corresponding weights 220 for prioritizing requests. The example attributes 210 include the flight connection time, the flight connection type, whether the flight segment is experiencing irregular operations, the group size associated with the user, the flight status, whether there is a special service request associated with the user, and whether the flight segment requires a mandatory COVID-19 request. When the departure time for the flight segment is less than 60 minutes away, the corresponding weight 220 assigned is 60. On the other hand, when the departure time is between one and two hours away, the corresponding weight assigned is 10. If the departure time is more than two hours away, the attribute scoring module 135 does not assign a weight to the flight connection time.

When the flight connection type is international, the corresponding weight 220 assigned is 20. When the flight connection type is domestic, the corresponding weight 220 assigned is 5.

When the flight segment is experiencing irregular operations, the corresponding weight 220 assigned is 80. When the group size associated with the user is greater than 16 passengers, the corresponding weight 220 assigned is 50. When the group size associated with the user is between 10 and 16 passengers, the corresponding weight 220 assigned is 30. Otherwise, if the group size is less than 10, the attribute scoring module 135 does not assign a weight to the group size.

When the flight segment is canceled, the corresponding weight 220 assigned is 60. When the flight segment is delayed, the corresponding weight 220 assigned is 20.

When the user has a special service request, the corresponding weight 220 assigned is 40. In other implementations, the attribute scoring module 135 may assign different weights based on the type of special service request, such as whether the user is an unaccompanied minor, requires a wheelchair, requires a service animal, etc. When the flight segment requires a mandatory COVID-19 test, the corresponding weight 220 assigned is 30.

While the table 200 includes a few example attributes 210 and corresponding weights 220, additional or alternative attributes 210 may be included, such as the fare class for the passenger, the passenger's airline status, whether the passenger has an infant, etc. Additionally, the weights included in the table 200 are merely example weights for ease of illustration only. The attributes 210 may have different weights assigned, the weights may be dynamic and change over time, and different sub-attributes may different corresponding weights. For example, rather than assigning weights to the "10-16" group member and the ">16 group" member sub-attributes, the attribute scoring module 135 may assign weights to "8-12," "13-20," and ">20" group member sub-attributes.

As mentioned above, the attribute scoring module 135 may then combine or aggregate the weights in any suitable manner to generate an overall score for the request. The attribute scoring module 135 may also determine a priority level based on the overall score for the request. For example, the attribute scoring module 135 may assign a priority score that is in proportion to the overall score for the request. The attribute scoring module 135 may additionally or alternatively assign a category (e.g., Low, Medium, High) based on the overall score for the request. Then the attribute scoring module 135 may compare the priority level to priority levels for other pending requests to rank the request in a queue of pending requests. The attribute scoring module 135 may then provide the ranked queue of pending requests to a remote agent client device for a remote agent assigned to handle the request.

FIG. 3 illustrates an example pending request display 300 which may be presented on a remote agent client device 142. The pending request display 300 includes a queue of pending requests presented in a ranked order to a remote airline agent. For each pending request, the display 300 may indicate the customer/passenger name 310 for the pending request, the amount of time that the customer/passenger has been waiting 320, the priority level 330 assigned to the pending request, and key attributes 340 associated with the pending request. More specifically, each pending request may include a priority level indicator 330, where each priority level is highlighted in a different color. For example, the High priority level may be indicated with a red color to alert the remote airline agent's attention to the High priority requests. The pending requests may be ranked according to the attribute scoring module 135. For example, the attribute scoring module 135 may rank the high priority level requests above the medium priority level requests, and the medium priority level requests above the low priority requests. Additionally, for requests in the same priority category, the attribute scoring module 135 may rank the requests based on a priority score assigned to each request and/or the amount of time that the customer/passenger has been waiting 320.

In any event, the highest ranked request for the remote airline agent is a high priority request for Ellen R. for a flight segment that is experiencing irregular operations, was canceled, and was scheduled to take off in less than an hour. In some implementations, the server device 102 may automatically connect the remote agent client device 142 to Ellen R.'s client device 106-116 to initiate a video chat with Ellen R. In other implementations, the display 300 may include a user control, which when selected by the remote airline agent, may connect the remote agent client device 142 to Ellen R.'s client device 106-116 to initiate the video chat.

As the remote airline agent communicates with Ellen R., the remaining requests are included in a ranked order in the queue, such that after ending the video chat with Ellen R., the remote agent client device 142 connects to the passenger client device 106-116 for the next highest ranking request in the queue (Christy B.).

The pending request display 300 may include requests which are routed to the remote airline agent by the request routing module 134. In some implementations, the request routing module 134 identifies characteristics of a request and/or characteristics of the user making the request, and determines which special skills are necessary, if any, to handle the request. If no special skills are necessary, the request routing module 134 sends the request to remote airline agents assigned to help with general requests or sends the request to each of the remote airline agents. If one or more special skills are necessary, the request routing module 134 sends the request to remote airline agents having the special skills. In some implementations, the request routing module 134 sends each request to each of the remote agent client devices 142 with an indication of the special skills necessary, if any, to handle the request. Each remote agent client device 142 then filters out requests which require special skills that a corresponding remote airline agent is not equipped to handle.

Figure 4:
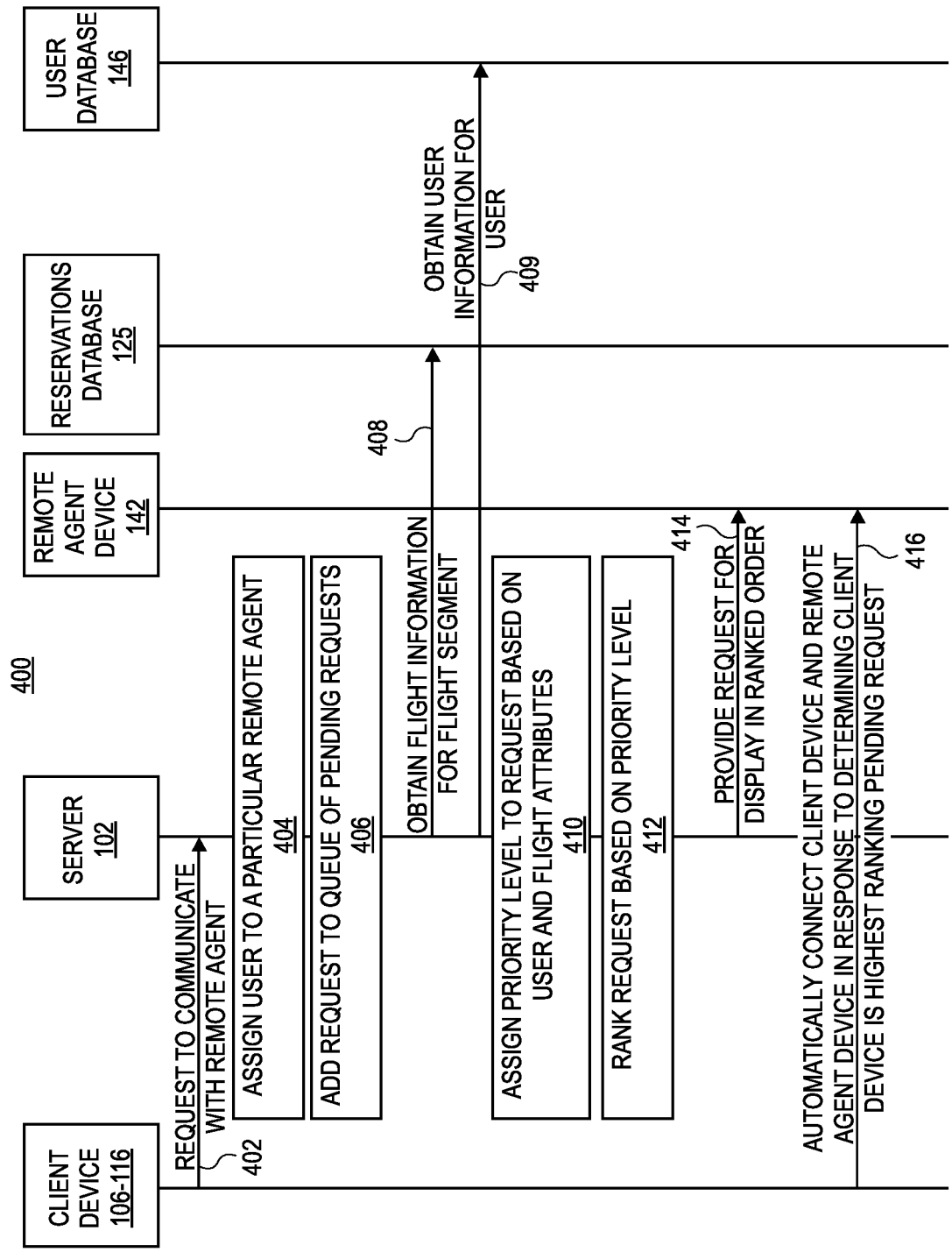
FIG. 4 illustrates a messaging diagram of an example procedure for receiving a request to communicate with a remote agent, assigning the request to particular remote agent(s), and ranking the request within a queue of ranked requests based on attributes associated with the request.

FIG. 4 illustrates a messaging diagram 400 of an example procedure for receiving and handling requests to communicate with a remote airline agent. The passenger client device 106-116 provides 402 a request to the server device 102 to communicate with a remote airline agent. In some implementations, the passenger client device 106-116 provides the request by selecting a user control associated with an airline reservation at an airline application executing on the passenger client device 106-116. In some scenarios, when several passengers are likely to need assistance, such as when a flight is canceled or when several flights at an airport are experiencing delays due to weather conditions for example, the server device 102 may provide instructions to the passenger client device 106-116 for communicating with the remote airline agent. For example, the server device 102 may transmit a notification to the passenger client device 106-116 suggesting that the passenger may want to communicate with a remote airline agent and including a user control for providing the request. In other scenarios, the passenger may provide the request by for example, scanning a QR code at an airport kiosk or other location within the airport that includes an indication that the QR code is a link to providing a request for a particular type of assistance (e.g., assistance with a canceled flight, assistance with COVID-19 testing, etc.).

The request may include identification information for the user and/or the flight segment. For example, the request may include the PNR for the user and the flight segment, the name of the user, a username for accessing a user profile for the user, etc.

The server device 102 may then route 404 the request to particular remote airline agent(s) equipped to handle the request. For example, the server device 102 may route the request by identifying characteristics of the request or the user initiating the request. The server device 102 then determines which special skills are necessary, if any, to handle the request. If no special skills are necessary, the server device 102 sends the request to remote airline agents assigned to help with general requests or sends the request to each of the remote airline agents. If one or more special skills are necessary, the server device 102 sends the request to remote airline agents having the special skills.

The server device 102 also adds 406 the request to the queues of pending requests for the remote airline agent(s) assigned the request. In other implementations, the server device 102 adds the request to each of the queues of each of the remote airline agent(s), and the remote agent client devices 142 filter out requests which the corresponding remote airline agents are not equipped to handle.

Then the server device 102 may obtain 408 flight information for the flight segment, for example for the airline reservations database 124 and may obtain 409 user information for the user from the user database 146. The flight information may include the destination location for the flight segment, the departure time, the arrival time, whether the flight is domestic or international, flight operations for the flight segment, a flight criticality level indicative of whether the user has a connecting flight at the destination location that the user needs to make, a flight urgency level indicative of the amount of time until the departure for the flight segment, a flight status indicative of whether the flight has been delayed, canceled, or is on time, whether the flight requires a COVID-19 test, etc.

The user information may include a user profile including the name of the user, the age of the user, a group size associated with the user for the flight segment, whether the user has an infant, a fare class for the user, a user status, a special service requests associated with the user, such as whether the user is an unaccompanied minor, requires a wheelchair, requires a service animal, requires an oxygen tank, is blind, is deaf, etc.

The server device 102 may assign 410 a priority level to the request based on flight attributes and/or user attributes obtained from the flight information and/or user information, respectively. More specifically, the server device 102 may identify attributes and/or sub-attributes of the request included in the flight information and/or the user information. The flight attributes may include a flight connection time until the upcoming flight segment, whether the upcoming flight segment is international or domestic, whether there are irregular operations (IRROPs) for the upcoming flight segment, the flight status of the upcoming flight (e.g., canceled, delayed, on time, etc.), whether there is a mandatory COVID-19 test required for the upcoming flight, etc. The user attributes may include the group size of the passenger's group, special service requests for the passenger, the fare class for the passenger, the passenger's airline status, whether the passenger has an infant, etc.

The server device 102 may then assign weights to each of the attributes and/or sub-attributes (e.g., whether the group size is greater than 16 passengers or between 10 and 16 passengers) identified for the request. Then the server device 102 may combine or aggregate the weights in any suitable manner to generate an overall score for the request. The server device 102 may then assign a priority level to the request based on the overall score.

For example, the priority level may be the overall score. In another example, the priority level may be a category, such as Low, Medium, or High, where the server device 102 assigns a Low priority to the request if the overall score is below a first threshold score, assigns a Medium priority to the request if the overall score is at or above the first threshold score but below a second threshold score, and assigns a High priority to the request if the overall score is at or above the second overall score. In yet another example, the priority level may include both a category and a numeric value.

The server device 102 may rank 412 the request within a queue of pending requests based on the priority levels assigned to the requests. Accordingly, the server device 102 dynamically updates the ranked order of the queue of pending requests in real-time based on the attributes associated with the request. In some implementations, the server device 102 may rank a master queue of all of the pending requests for all of the remote airline agents. Then requests that are not assigned to a particular remote airline agent may be filtered out of the particular remote airline agent's queue. In other implementations, a remote airline agent's client device 142 may receive the request with the priority level (e.g., a priority score). Then the remote airline agent's client device 142 may rank the request within the particular queue of requests assigned to the remote airline agent. In yet other implementations, the server device 102 may obtain each of the requests in a particular remote airline agent's queue and rank the request within the particular remote airline agent's queue.

Then the server device 102 may provide 414 the request for display in a ranked order to the remote agent client device(s) 142 for remote airline agent(s) assigned the request. When the request is the highest ranked request in a remote airline agent's queue, the server device 102 may automatically connect 416 the passenger client device 106-116 and the remote agent client device 142 for the remote airline agent to initiate a video chat between the passenger client device 106-116 and the remote airline agent. For example, the server device 102 may transmit a notification to the remote agent client device 142 to initiate a video chat with a particular passenger client device 106-116. In another example, the server device 102 may obtain an indication of the highest ranked request in a remote airline agent's queue, and provide a link to both the remote agent client device 142 and the passenger client device 106-116 for a video chat. Then the server device 102 receives video and audio data from the remote agent client device 142 and transmits the video and audio data to the passenger client device 106-116. Likewise, the server device 102 receives video and audio data from the passenger client device 106-116 and transmits the video and audio data to the remote agent client device 142.

Figure 5:
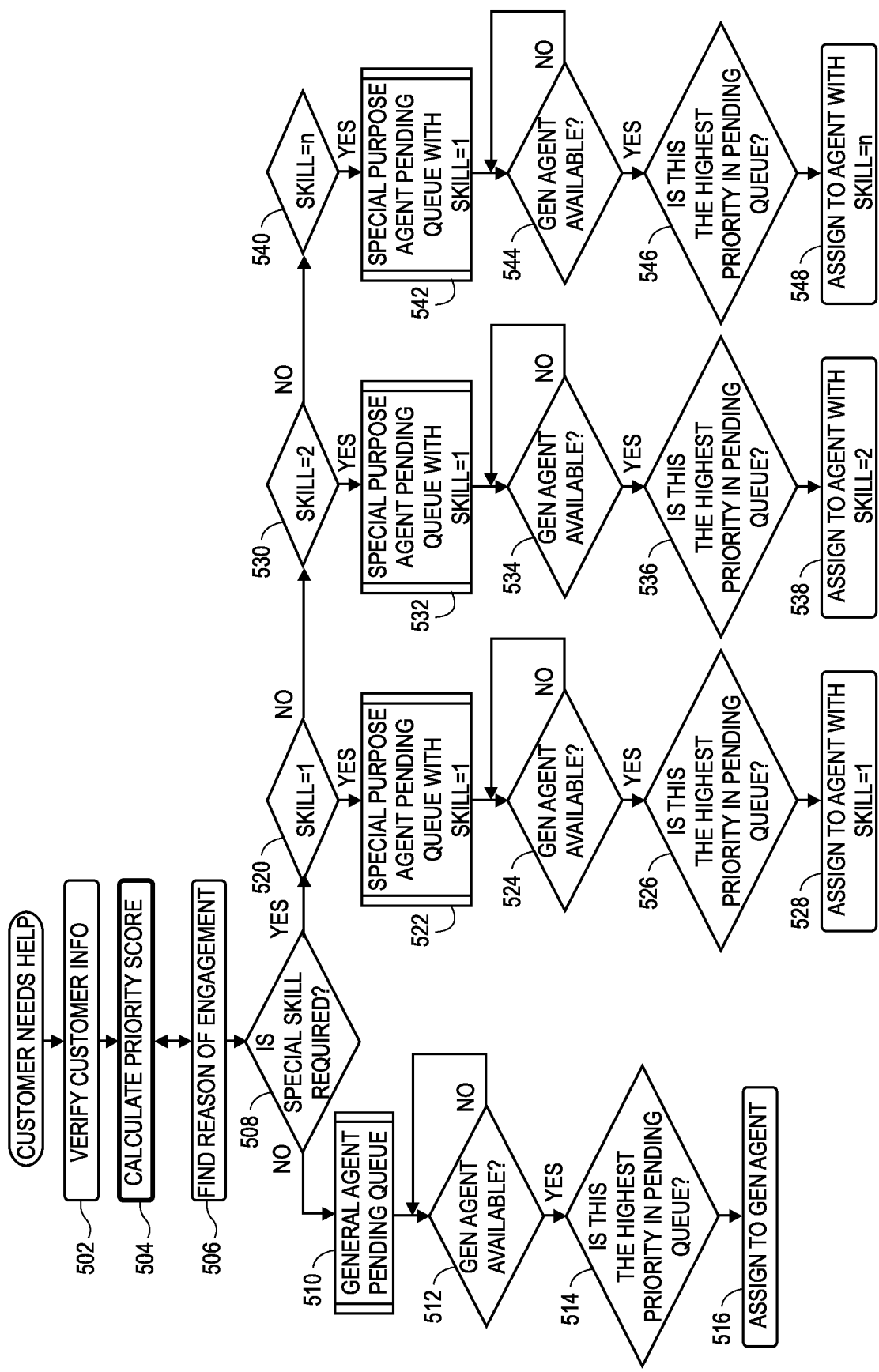
FIG. 5 depicts a flow diagram representing an example method for routing a request to communicate with a remote agent to particular remote agent(s) based on characteristics of the user or the request, which may be implemented by a server computer.

FIG. 5 illustrates a flow diagram representing an example method 500 for routing a request to communicate with a remote agent to particular remote agent(s) based on characteristics of the user or the request. The method may be executed on the server device 102. For example, at least a portion of the method 500 may be performed by the request routing module 134 which may be disposed within the server device 102. In an embodiment, the request routing module 134 may include computer-executable instructions stored on one or more non-transitory, tangible, computer-readable storage media or devices, and the computer-executable instructions of the request routing module 134 may be executed to perform the method 500.

At block 502, in response to receiving a request from a passenger to communicate with a remote airline agent, the server device 102 may obtain and verify the user information for the user initiating the request. For example, the server device 102 may verify the user information by obtaining user information from the user database 146 and/or comparing the user information from the user database 146 to user information included in the request.

At block 504, the server device 102 assigns a priority level (e.g., a priority score) for the request based on flight attributes and/or user attributes associated with the request. The server device 102 may identify characteristics of the user and/or characteristics of the request, such as the reason for the request (block 506). For example, the reason for the request may be to obtain assistance regarding the COVID-19 testing process for a flight segment that requires mandatory COVID-19 testing. In another example, the reason for the request may be to reschedule a canceled flight segment due to irregular operations. The characteristics of the user may include the preferred language of the user, whether the user is deaf or has trouble hearing, whether the user is blind or has poor vision, the user's airline status, etc.

At block 508, the server device 102 determines whether a special skill is required by a remote airline agent to handle the request. For example, a first set of remote airline agents may be equipped to handle general requests, a second set of remote airline agents may be equipped to handle requests made by Spanish speakers, a third set of remote airline agents may be equipped to handle requests made by passengers who are deaf, a fourth set of remote airline agents may be equipped to handle requests related to COVID-19 testing, etc.

If no special skill is required, the request may be added to the queues of remote airline agents equipped to handle general requests (e.g., the first set of remote airline agents) (block 510). If at least one remote airline agent is equipped to handle a general request is available (block 512), the request is added to the remote airline agent's queue. If the request is the highest ranked request in the remote airline agent's queue (block 514), the server device 102 may connect the remote airline agent's client device 142 to the client device 106-116 of the passenger initiating the request, and the request is handled by the remote airline agent (block 516).

If a first special skill is required (e.g., speaking Spanish), the request may be added to the queues of remote airline agents equipped to handle requests that require the first special skill (e.g., the second set of remote airline agents) (block 522). If at least one remote airline agent is equipped to handle a request that requires the first special skill (block 524), the request is added to the remote airline agent's queue. If the request is the highest ranked request in the remote airline agent's queue (block 526), the server device 102 may connect the remote airline agent's client device 142 to the client device 106-116 of the passenger initiating the request, and the request is handled by the remote airline agent (block 528).

If a second special skill is required (e.g., communicating with people who are deaf), the request may be added to the queues of remote airline agents equipped to handle requests that require the second special skill (e.g., the third set of remote airline agents) (block 532). If at least one remote airline agent is equipped to handle a request that requires the second special skill (block 534), the request is added to the remote airline agent's queue. If the request is the highest ranked request in the remote airline agent's queue (block 536), the server device 102 may connect the remote airline agent's client device 142 to the client device 106-116 of the passenger initiating the request, and the request is handled by the remote airline agent (block 538).

If a third special skill is required (e.g., providing assistance related to COVID-19 testing), the request may be added to the queues of remote airline agents equipped to handle requests that require the third special skill (e.g., the fourth set of remote airline agents) (block 542). If at least one remote airline agent is equipped to handle a request that requires the third special skill (block 544), the request is added to the remote airline agent's queue. If the request is the highest ranked request in the remote airline agent's queue (block 546), the server device 102 may connect the remote airline agent's client device 142 to the client device 106-116 of the passenger initiating the request, and the request is handled by the remote airline agent (block 548).

Figure 6:
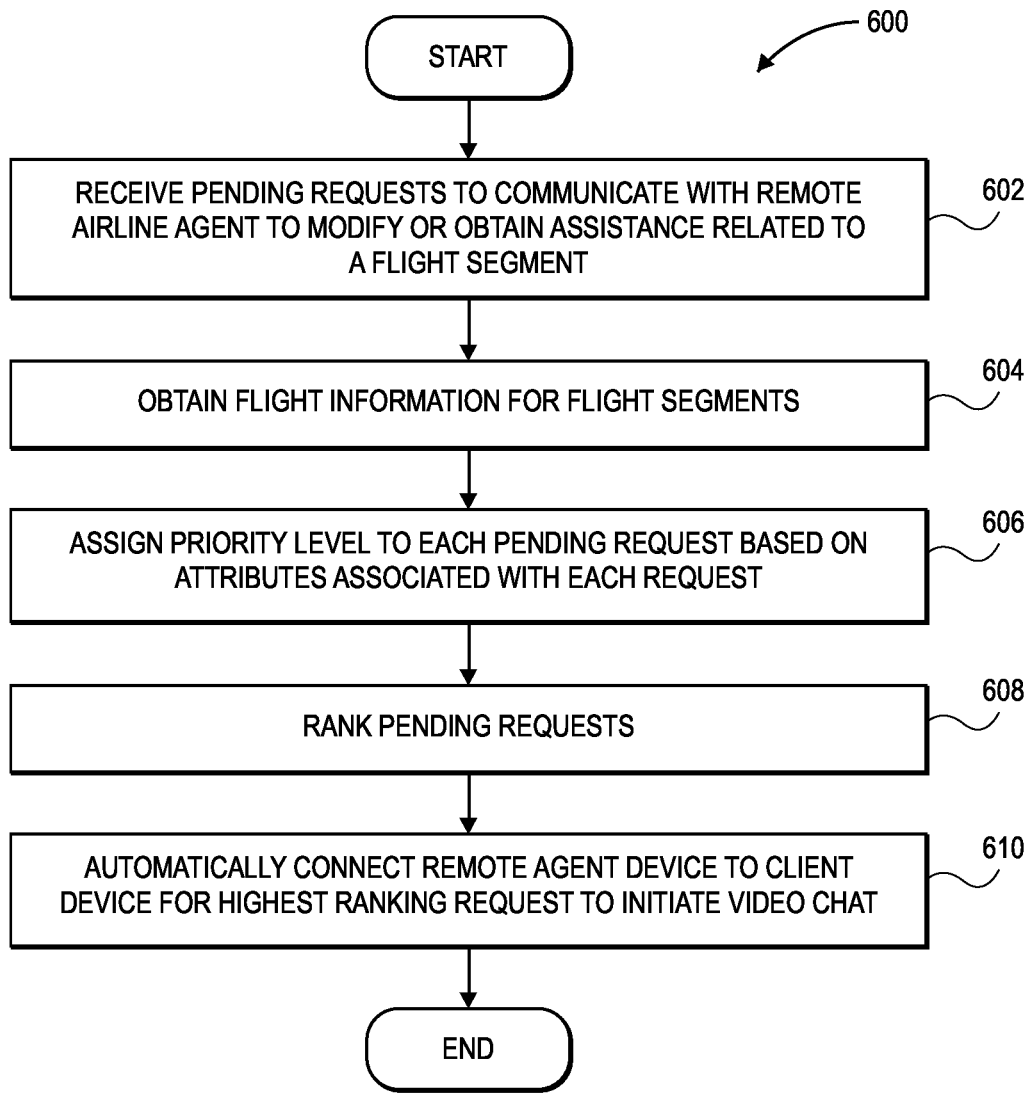
FIG. 6 depicts a flow diagram representing an example method for automatically providing a remote airline agent to a user, which may be implemented by a server computer.

FIG. 6 illustrates a flow diagram representing an example method 600 for automatically providing a remote airline agent to a user. The method may be executed on the server device 102. For example, at least a portion of the method 600 may be performed by the attribute scoring module 135 which may be disposed within the server device 102. In an embodiment, the attribute scoring module 135 may include computer-executable instructions stored on one or more non-transitory, tangible, computer-readable storage media or devices, and the computer-executable instructions of the attribute scoring module 135 may be executed to perform the method 600.

At block 602, the server device 102 receives requests to communicate with remote airline agents from users each attempting to modify a flight segment or obtain assistance related to the flight segment. Each request may be received from a passenger client device 106-116 selecting a user control associated with an airline reservation at an airline application executing on the passenger client device 106-116. In some scenarios, when several passengers are likely to need assistance, such as when a flight is canceled or when several flights at an airport are experiencing delays due to weather conditions for example, the server device 102 may provide instructions to the passenger client devices 106-116 for communicating with the remote airline agents. For example, the server device 102 may transmit notifications to the passenger client devices 106-116 suggesting that the passengers may want to communicate with remote airline agents and including user controls for providing the requests. In other scenarios, the passengers may provide the requests by for example, scanning a QR code at an airport kiosk or other location within the airport that includes an indication that the QR code is a link to providing a request for a particular type of assistance (e.g., assistance with a canceled flight, assistance with COVID-19 testing, etc.).

Each request may include identification information for the user and/or the flight segment. For example, the request may include the PNR for the user and the flight segment, the name of the user, a username for accessing a user profile for the user, etc.

At block 604, the server device 102 may obtain flight information for the flight segment in each request for example from the airline reservations database 124. The server device 102 may also obtain user information for the users in each request, for example from the user database 146. The flight information may include the destination location for the flight segment, the departure time, the arrival time, whether the flight is domestic or international, flight operations for the flight segment, a flight criticality level indicative of whether the user has a connecting flight at the destination location that the user needs to make, a flight urgency level indicative of the amount of time until the departure for the flight segment, a flight status indicative of whether the flight has been delayed, canceled, or is on time, whether the flight requires a COVID-19 test, etc.

The user information may include a user profile including the name of the user, the age of the user, a group size associated with the user for the flight segment, whether the user has an infant, a fare class for the user, a user status, a special service requests associated with the user, such as whether the user is an unaccompanied minor, requires a wheelchair, requires a service animal, requires an oxygen tank, is blind, is deaf, etc.

Then at block 606, the server device 102 may assign priority levels to each of the requests based on flight attributes and/or user attributes associated with each request and obtained from the flight information and/or user information, respectively. More specifically, the server device 102 may identify attributes and/or sub-attributes of each request included in the flight information and/or the user information. The flight attributes may include a flight connection time until the upcoming flight segment, whether the upcoming flight segment is international or domestic, whether there are irregular operations (IRROPs) for the upcoming flight segment, the flight status of the upcoming flight (e.g., canceled, delayed, on time, etc.), whether there is a mandatory COVID-19 test required for the upcoming flight, etc. The user attributes may include the group size of the passenger's group, special service requests for the passenger, the fare class for the passenger, the passenger's airline status, whether the passenger has an infant, etc.

The server device 102 may then assign weights to each of the attributes and/or sub-attributes (e.g., whether the group size is greater than 16 passengers or between 10 and 16 passengers) identified for the request. Then the server device 102 may combine or aggregate the weights in any suitable manner to generate an overall score for the request. The server device 102 may then assign a priority level to the request based on the overall score.

For example, the priority level may be the overall score. In another example, the priority level may be a category, such as Low, Medium, or High, where the server device 102 assigns a Low priority to the request if the overall score is below a first threshold score, assigns a Medium priority to the request if the overall score is at or above the first threshold score but below a second threshold score, and assigns a High priority to the request if the overall score is at or above the second overall score. In yet another example, the priority level may include both a category and a numeric value.

The server device 102 may then rank the requests within a queue of pending requests based on the priority levels assigned to the requests (block 608). Then the server device 102 may provide the requests for display in a ranked order to remote agent client device(s) 142 for remote airline agent(s) assigned the requests. The server device 102 may automatically connect the passenger client device 106-116 for the highest ranked request and the remote agent client device 142 for the remote airline agent to initiate a video chat between the passenger client device 106-116 and the remote airline agent (block 610). For example, the server device 102 may transmit a notification to the remote agent client device 142 to initiate a video chat with a particular passenger client device 106-116. In another example, the server device 102 may obtain an indication of the highest ranked request in a remote airline agent's queue, and provide a link to both the remote agent client device 142 and the passenger client device 106-116 for a video chat. Then the server device 102 receives video and audio data from the remote agent client device 142 and transmits the video and audio data to the passenger client device 106-116. Likewise, the server device 102 receives video and audio data from the passenger client device 106-116 and transmits the video and audio data to the remote agent client device 142.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as providing examples only and does not describe every possible embodiment, as describing every possible embodiment would be impractical, if not impossible. One could implement numerous alternate embodiments, using either current technology or technology developed after the filing date of this application.

We claim:

1. A method for automatically providing a remote airline agent to a user, the method comprising:
   receiving, at one or more processors, a request to communicate with a remote airline agent from a user attempting to modify a flight segment or obtain assistance related to the flight segment, the request including identification information for the user initiating the request;
   identifying, by the one or more processors, a particular skill required to handle the request;
   routing, by the one or more processors, the request to a queue of one or more remote airline agents equipped to handle requests that require the particular skill;
   in response to determining that the user's request is next in the queue of a plurality of pending requests that require the particular skill, transmitting, by the one or more processors, a message to the user to initiate a video chat; and automatically connecting, by the one or more processors, to a client device for the request to initiate the video chat between the user and one of the one or more remote airline agents to modify the flight segment or provide assistance related to the flight segment, wherein the message activates an airline application for the user to enable connection to an on demand service that appends the user's request to the plurality of pending requests and initiates the video chat with the remote airline agent when the user's request is next in the queue.

2. The method of claim 1, further comprising:

assigning, by the one or more processors, a priority level to the request based on one or more attributes associated with the request, the one or more attributes including at least one of: flight attributes related to a flight status, flight operations, a flight connection time, a flight urgency level, or a flight criticality level for the flight segment, or user attributes related to a user status, a user wait time, or a group size;

ranking, by the one or more processors, the request in the plurality of pending requests in accordance with the assigned priority level, wherein determining that the user's request is next in the queue includes determining that the user's request is a highest ranked request of the plurality of pending requests.

3. The method of claim 2, further comprising:

providing, by the one or more processors, the plurality of pending requests in a ranked order via a user interface of the remote airline agent.

4. The method of claim 3, further comprising:

providing, by the one or more processors, a priority level indicator to be displayed with each of the plurality of pending requests on the user interface to indicate the priority level of each of the plurality of pending requests to the remote airline agent.

5. The method of claim 3, further comprising:

dynamically updating, by the one or more processors, the ranked order of the plurality of pending requests in real-time based on the one or more attributes associated with each pending request.

6. The method of claim 2, wherein assigning the priority level to the request based on the one or more attributes associated with the request includes:

assigning, by the one or more processors, a score to each of the one or more attributes associated with the request;

combining, by the one or more processors, the scores for each of the one or more attributes associated with the request to generate an overall score for the request; and assigning, by the one or more processors, the priority level based on the overall score for the request.

7. The method of claim 6, wherein combining the scores for each of the one or more attributes associated with the request includes:

assigning, by the one or more processors, a weight to each of the one or more attributes; and aggregating, by the one or more processors, weighted scores for each of the one or more attributes.

8. The method of claim 1, wherein the particular skill is at least one of: speaking Spanish, handling requests made by deaf passengers, or handling requests related to COVID-19 testing.

9. The method of claim 1, wherein routing the request includes:

filtering, by the one or more processors, the request from queues of remote agents that do not have the particular skill.

10. A system for automatically providing a remote airline agent to a user, the system comprising:

a communication network;

one or more processors coupled to the communication network; and a non-transitory computer readable memory coupled to the communication network and the one or more processors, including instructions stored thereon that, when executed by the one or more processors, cause the one or more processors to:

receive, via the communication network, a request to communicate with a remote airline agent from a user attempting to modify a flight segment or obtain assistance related to the flight segment, the request including identification information for the user initiating the request;

identify a particular skill required to handle the request;

route the request to a queue of one or more remote airline agents equipped to handle requests that require the particular skill;

in response to determining that the user's request is next in the queue of a plurality of pending requests that require the particular skill, transmit, via the communication network, a message to the user to initiate a video chat; and automatically connect to a client device for the request to initiate the video chat between the user and one of the one or more remote airline agents to modify the flight segment or provide assistance related to the flight segment, wherein the message activates an airline application for the user to enable connection to an on demand service that appends the user's request to the plurality of pending requests and initiates the video chat with the remote airline agent when the user's request is next in the queue.

11. The system of claim 10, wherein the instructions further cause the one or more processors to:

assign a priority level to the request based on one or more attributes associated with the request, the one or more attributes including at least one of: flight attributes related to a flight status, flight operations, a flight connection time, a flight urgency level, or a flight criticality level for the flight segment, or user attributes related to a user status, a user wait time, or a group size; and rank the request in the plurality of pending requests in accordance with the assigned priority level, wherein to determine that the user's request is next in the queue, the instructions cause the one or more processors to determine that the user's request is a highest ranked request of the plurality of pending requests.

12. The system of claim 11, wherein the instructions further cause the one or more processors to:

provide the plurality of pending requests in a ranked order via a user interface of the remote airline agent.

13. The system of claim 12, wherein the instructions further cause the one or more processors to:

provide a priority level indicator to be displayed with each of the plurality of pending requests on the user interface to indicate the priority level of each of the plurality of pending requests to the remote airline agent.

14. The system of claim 12, wherein the instructions further cause the one or more processors to:
dynamically update the ranked order of the plurality of pending requests in real-time based on the one or more attributes associated with each pending request.

15. The system of claim 10, wherein to assign the priority level to the request based on the one or more attributes associated with the pending request, the instructions cause the one or more processors to:
assign a score to each of the one or more attributes associated with the request;
combine the scores for each of the one or more attributes associated with the request to generate an overall score for the request; and
assign the priority level based on the overall score for the request.

16. The system of claim 15, wherein to combine the scores for each of the one or more attributes associated with the request, the instructions cause the one or more processors to:
assign a weight to each of the one or more attributes; and
aggregate weighted scores for each of the one or more attributes.

17. A non-transitory computer readable memory coupled to the communication network and the one or more processors, including instructions stored thereon that, when executed by the one or more processors, cause the one or more processors to:
receive a request to communicate with a remote airline agent from a user attempting to modify a flight segment or obtain assistance related to the flight segment, the request including identification information for the user initiating the request;
identify a particular skill required to handle the request;
route the request to a queue of one or more remote airline agents equipped to handle requests that require the particular skill;
in response to determining that the user's request is next in the queue of a plurality of pending requests that require the particular skill, transmit a message to the user to initiate a video chat; and
automatically connect to a client device for the request to initiate the video chat between the user and one of the one or more remote airline agents to modify the flight segment or provide assistance related to the flight segment, wherein the message activates an airline application for the user to enable connection to an on demand service that appends the user's request to the plurality of pending requests and initiates the video chat with the remote airline agent when the user's request is next in the queue.

18. The non-transitory computer readable memory of claim 17, wherein the instructions further cause the one or more processors to:
assign a priority level to the request based on one or more attributes associated with the request, the one or more attributes including at least one of: flight attributes related to a flight status, flight operations, a flight connection time, a flight urgency level, or a flight criticality level for the flight segment, or user attributes related to a user status, a user wait time, or a group size; and
rank the request in the plurality of pending requests in accordance with the assigned priority level,
wherein to determine that the user's request is next in the queue, the instructions cause the one or more processors to determine that the user's request is a highest ranked request of the plurality of pending requests.

19. The non-transitory computer readable memory of claim 18, wherein the instructions further cause the one or more processors to:
provide the plurality of pending requests in a ranked order via a user interface of the remote airline agent.

20. The non-transitory computer readable memory of claim 19, wherein the instructions further cause the one or more processors to:
provide a priority level indicator to be displayed with each of the plurality of pending requests on the user interface to indicate the priority level of each of the plurality of pending requests to the remote airline agent.

* * * * *